Nov. 29, 1966 C. J. ELLERD 3,288,491
ARTICULATED CARGO VEHICLE
Filed Feb. 5, 1965 4 Sheets-Sheet 1
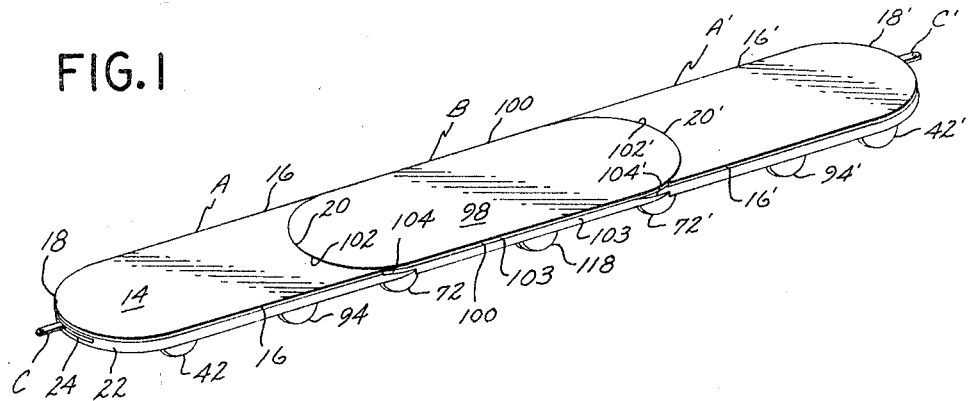
FIG. 1
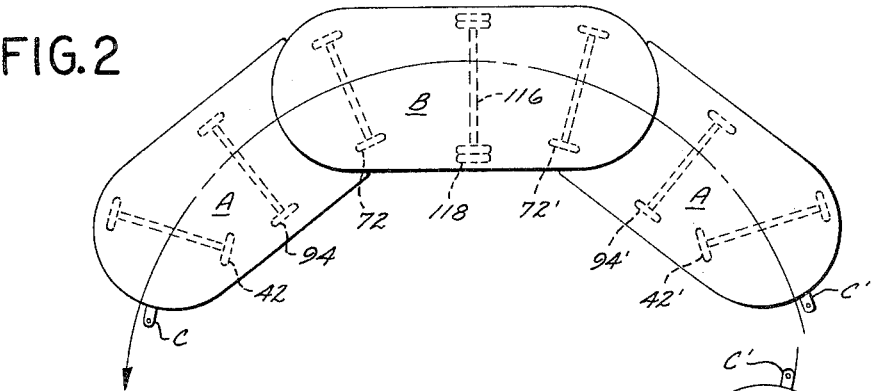
FIG. 2
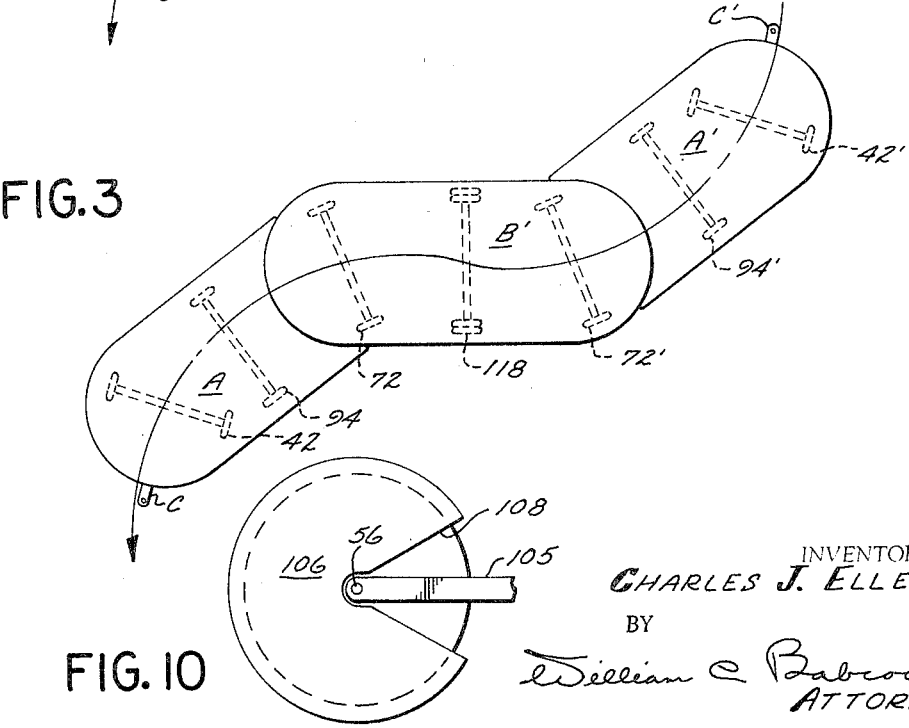
FIG. 3
FIG. 10
INVENTOR.
CHARLES J. ELLERD
BY
William C. Babcock
ATTORNEY

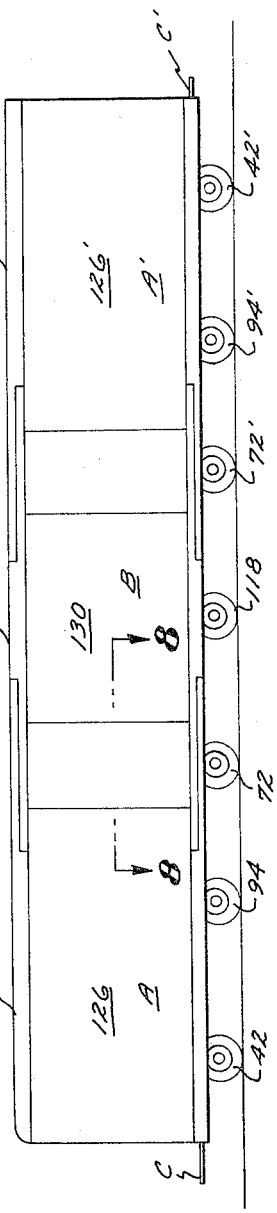

Nov. 29, 1966  C. J. ELLERD  3,288,491
ARTICULATED CARGO VEHICLE
Filed Feb. 5, 1965  4 Sheets-Sheet 3
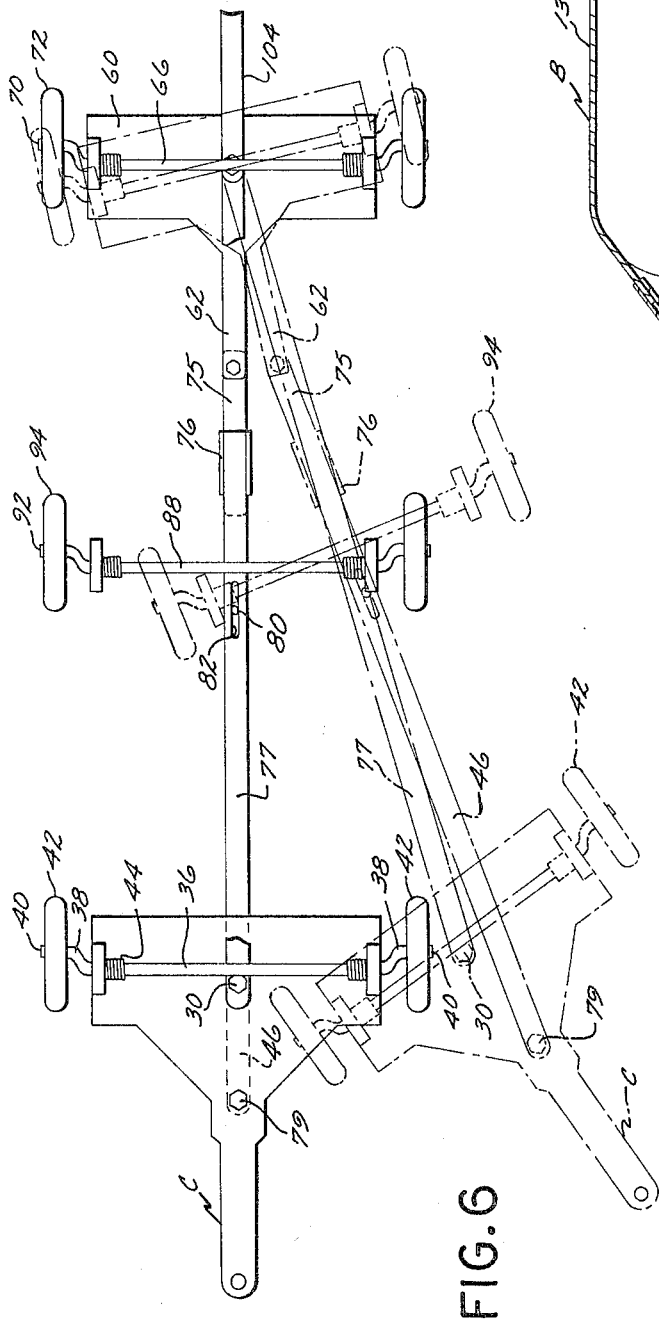
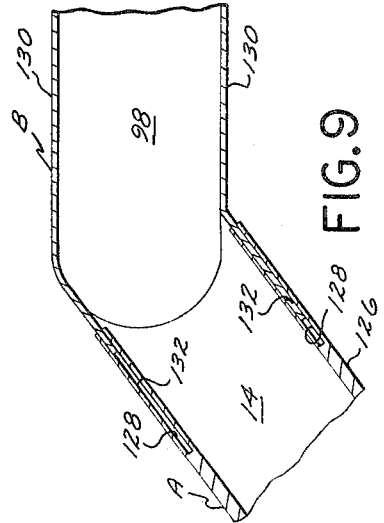
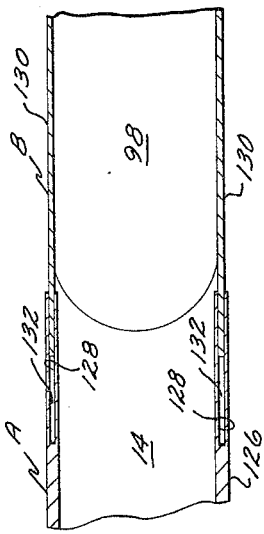
INVENTOR.
CHARLES J. ELLERD
BY
William C. Babcock
ATTORNEY Nov. 29, 1966    C. J. ELLERD    3,288,491
ARTICULATED CARGO VEHICLE
Filed Feb. 5, 1965    4 Sheets-Sheet 4
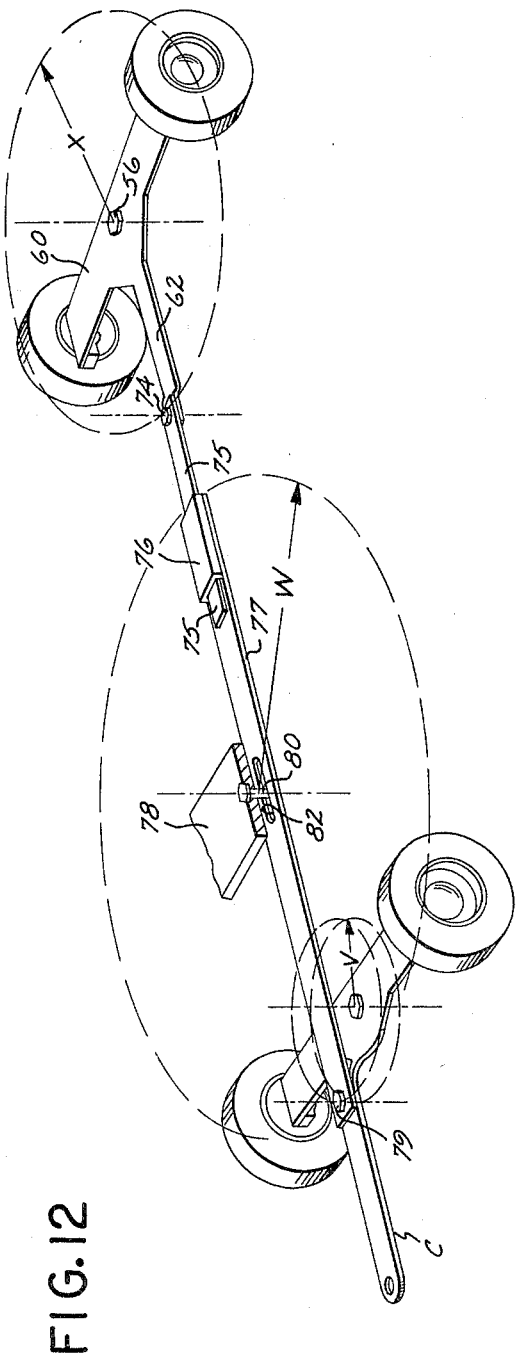
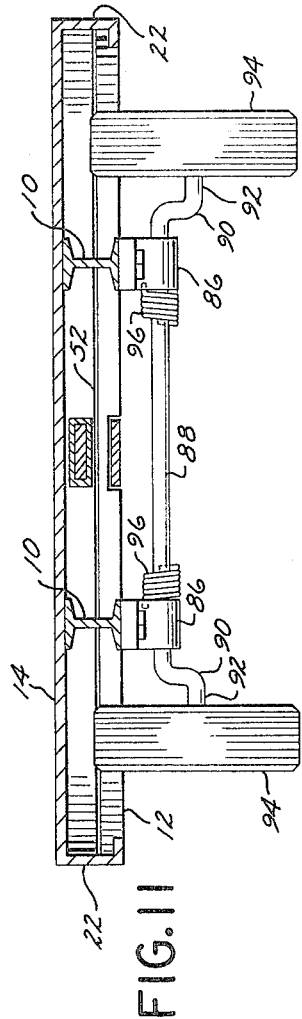
INVENTOR.
CHARLES J. ELLERD
BY
William C. Babcock
ATTORNEY United States Patent Office 3,288,491
Patented Nov. 29, 1966

3,288,491
ARTICULATED CARGO VEHICLE
Charles J. Ellerd, 1669 Chester Ave., Bakersfield, Calif.
Filed Feb. 5, 1965, Ser. No. 430,721
9 Claims. (Cl. 280—410)

The present invention relates generally to the field of cargo transport, and more particularly to an articulated cargo vehicle.

A major object of the present invention is to provide an articulated vehicle preferably comprising three wheel-supported sections which cooperatively provide a supporting platform of substantial and constant length which is relatively close to the ground for ease in loading and unloading cargo therefrom.

Another object of the invention is to supply an articulated vehicle that is adapted to be drawn equally well from either end thereof, or may be self-propelled if desired.

A still further object of the invention is to furnish an articulated vehicle having a short turning radius and a high degree of maneuverability, and one that is particularly adapted to be drawn through and turning at the end of avenues or alleys of vineyards, farms or orchards during harvesting of a crop.

Yet another object of the invention is to supply an articulated vehicle in which the two sections following the lead section thereof are automatically steered and to follow the lead section as it turns, yet which vehicle has a high degree of lateral stability due to the low center of gravity thereof.

A further object of the invention is to provide an articulated vehicle that is adapted to carry a sectional upper enclosed body which extends the length thereof, which body may be advantageously and economically refrigerated by two units that recirculate the refrigerated air.

Yet still another object of the invention is to supply an articulated vehicle which can maintain an even distribution of laden weight, yet can be effectively braked without disturbance of the cargo borne thereby.

Still a further object of the invention is to provide a cargo vehicle including a continuous articulated tow bar extending the length thereof, which is so constructed as to not interfere in any way with the guidance or steering of the vehicle.

These and other objects and advantages of the articulated vehicle will become apparent from the following description of a preferred form thereof, and from the accompanying drawings illustrating the same, in which:

FIGURE 1 is a perspective view of the articulated cargo vehicle of the present invention;

FIGURE 2 is a top plan view showing the manner in which the two wheel-supported sections following the lead section of the vehicle are automatically guided to follow the same when the lead section is moved to the left as illustrated in this figure;

FIGURE 3 is a top plan view of the vehicle showing the manner in which the two rear wheel-supported sections follow the lead section when the lead section is moved to the left as shown;

FIGURE 4 is a bottom plan view of the vehicle shown in FIGURE 1;

FIGURE 5 is a longitudinal cross-sectional view of a portion of the vehicle, taken on the line 5—5 of FIGURE 4;

FIGURE 6 is a diagrammatic view showing the manner in which the wheels of an intermediate section of the vehicle are automatically guided when the lead section turns;

FIGURE 7 is a side elevational view of the vehicle on which an enclosed upper body portion is mounted to protect cargo being carried;

FIGURE 8 is a fragmentary longitudinal cross-sectional view of the vehicle shown in FIGURE 7, taken on the line 8—8 thereof;

FIGURE 9 is the same cross-sectional view of the vehicle shown in FIGURE 8, but with the lead section having been pivoted relative to the intermediate section;

FIGURE 10 is a fragmentary top plan view of the vehicle, taken on the line 10—10 of FIGURE 5;

FIGURE 11 is a transverse cross-sectional view of the vehicle, taken on the line 11—11 of FIGURE 4; and FIGURE 12 is a perspective view of a portion of the vehicle illustrating the pivotal movements of the steering mechanism.

With continuing reference to the drawings, particularly FIGURES 1 to 5, for the general arrangement of the invention, it will be seen that the articulated vehicle includes first and second wheel-supported end sections A and A' respectively, which are pivotally connected to opposite ends of an intermediate wheel-supported section B. Tow bars C and C' project from the free end extremities of end sections A and A' respectively, and each tow bar is adapted to be used in drawing the vehicle in the direction in which it projects. Obviously, the tow bars C and C' can also be used for backing the vehicle, if required.

Inasmuch as the first and second end sections A and A' are structurally the same, a detailed description of only section A will be given. Those components of end section A' corresponding to like elements of end section A are designated in the drawings by the same numerals used in the description of section A, but to which primes have been added.

The first section A, as best seen in FIGURES 4 and 11, includes two laterally spaced parellel rigid frame members 10, which are illustrated as I beams in FIGURE 11. However, channels or like structural members may be used in lieu of I beams, if desired. One end of the I beams 10 abut against a circular ring 12, the diameter of which is substantially greater than the lateral spacing between the frame members 10. Also, as shown in FIGURE 11, the ring 12 is of substantially lesser depth than the frame members 10.

Frame members 10 support a rigid horizontal platform section 14, which as shown in FIGURE 1, comprises two parallel side edges 16, a convex curved end 18 adjacent draw bar C, and a concave curved end 20 adjacent ring 12. As illustrated in FIGURE 11, a continuous L-shaped flange 22 depends from edges 16 and 18. A slot 24 (FIGURE 1) is formed in flange 22 and so located that the draw bar C may project outwardly therethrough.

A cross piece 26 (FIGURE 5) is rigidly secured to flanges 22 by conventional means and located adjacent the edge 18 of the platform section 14. A plate 28, also shown in FIGURE 5, is pivotally connected to cross piece 26 by a bolt 30 which extends upwardly through vertically aligned openings formed in the plate and cross piece. Plate 28 is provided with an upwardly and forwardly projecting extension 32 that is connected to the draw bar C. Two laterally spaced, transversely aligned journal boxes 34 are rigidly affixed to the under side of plate 28, and these journal boxes rotatably support a shaft 36 having downturned ends 38, from which stub shafts 40 project to rotatably support two wheels 42.

Two torsion springs 44 are shown in FIGURE 4, the ends of which are connected to the shaft 36 and the journal boxes 34 to minimize shock transmitted to the platform section A as the vehicle travels over rough terrain. The center line of bolt 30 and the longitudinal axis of stub shaft 40 lie in the same vertical plane. An elongate tow bar section 46 is provided, one end 48 of which pivotally engages the bolt 30 (FIGURE 5). The tow bar section 46 is supported above the upper surface of the cross piece 26 by a collar 50 that engages the bolt 30.

The upper edge of ring 12 supports a flat, horizontal deck 52, as illustrated in FIGURES 4, 5, and 11, which is situated below the platform section 14. Two arcuate openings 54 are formed in deck 52 that are located opposite one another. A centrally disposed bore is also formed in deck 52 which is engaged by a bolt 56 that extends through an opening 58 formed in the tow bar section 46 (FIGURE 5).

A second plate 60, best seen in FIGURES 4 and 5 rests on the upper surface of deck 52, and in which a bore is formed which is engaged by bolt 56. A tongue 62 projects from plate 60 towards the draw bar C, as shown in FIGURE 5, and two journal blocks 64 depend from the second plate through the openings 54 in deck 52.

The journal blocks 64 rotatably support a shaft 66 having two downturned end portions 68 from which stub shafts 70 project and on which wheels 72 are rotatably supported. The longitudinal center lines of the stub shaft 70 and the longitudinal axis of bolt 56 (FIGURE 5) lie in the same vertical plane.

By means of an anchor bolt 74, the forward end of the tongue 62 is pivotally connected to an elongate rigid link 75. Link 75 is longitudinally slidable in a sleeve 76 that is mounted on the rear end of a steering member 77. The forward end of the steering member 77 is pivotally connected by a bolt 79 to the rear of the tow bar C, as shown in FIGURES 5 and 12.

A cross member 78 is provided which extends between the flanges 22 situated below the side edges 16 of platform 14, as shown in FIGURE 5. A pin 80 depends from cross member 78 that slidably engages an elongate slot 82 formed in the steering member 77.

A third pair of journal blocks 86 are affixed to, and depend from the frame members 10 (FIGURES 4 and 5), which are situated intermediate the journal blocks 34 and 64. Journal blocks 86 rotatably support a shaft 88 that has two downturned ends 90 which develop into outwardly extending stub shafts 92 that rotatably support two wheels 94. Two torsion springs 96 encircle the shaft 88, the ends of which are affixed to the shaft 88 and journal blocks 86. The shaft 66, as also shown in FIGURES 4 and 5, is also provided with torsion springs 98 that are affixed to the journal blocks 64 and shaft 66.

The intermediate section B of the vehicle, as best seen in FIGURES 1, 4 and 5, includes a flat horizontal platform section 98 having straight parallel side edges 100 and convex end portions 102 and 102' situated adjacent the concave edges 20 and 20' respectively of the end sections A and A' respectively. Flanges 103 of the same transverse cross section as the flanges 22 depend from the side edges 100 of the center section B, as can be seen in FIGURE 1. Also, flanges 104 of such depth that they will not contact the second plates 60 and 60' of the end sections A and A' when they are connected to the center section B depend from the curved end edges 102 and 102', as shown in FIGURES 1 and 5.

Two longitudinally spaced bolts 56 and 56' depend from the platform section 98, as shown in FIGURES 4 and 5, in order that the sections A and A' can pivot relative to the center section B, as well be explained in detail hereinafter. The bolts 56 and 56' engage an elongate draw bar section 105 that extends therebetween, as also shown in FIGURES 4 and 5.

A circular spacer 106, best seen in FIGURES 5 and 10, is affixed to the under side of the platform section B, and is slightly thicker than the draw bar section 105. A wedge-shaped opening 108 is formed in spacer 106, through which the draw bar section 105 extends. The spacer 106 rests on the upper surface of a circular flat body 110, which in turn is supported on the upper surface of the second plate 60. The bolt 56' also has a spacer and body associated therewith identical to those just described, but which are not illustrated herein.

The intermediate section B also includes two parallel, laterally spaced frame members 112 which are affixed to the under side of the platform section 98. Members 112 support two elliptical springs 114, which in turn support a transverse axle 116 on the ends of which wheels 118 are rotatably mounted.

When a forwardly directed force is applied to the two bar C, the vehicle is moved forwardly without any strain being placed on the platform sections 14, 14' and 98. The tractive force applied to the two bar C is transferred therefrom to the first plate 28, and from this plate to the bolt 30. The force transmitted to the bolt 30 is in turn transferred therefrom by the two bar section 46 to the bolt 56, as best seen in FIGURE 5. The forward tractive force on the bolt 56 is transferred by the tow bar section 105 to the bolt 56'. From the bolt 56' the forward tractive force is transferred through the tow bar section 46' to the bolt 30'. In this manner the forwardly directed force on the tow bar C is transferred to the platform sections A, B and A' without any longitudinally directed strain being imposed thereon.

When the tractor or other power device pulling on the tow bar C turns, it will be apparent from an inspection of FIGURES 4 and 6 that the tow bar sections 46 and 46' pivot relative to the tow bar section 105. However, the tractive force exerted on the tow bar sections 46, 46' and 105 continues as above described, and the vehicle is drawn during a turning movement without any strain being imposed on the platform sections A, A' and B.

When a sidewise force as well as a forward force is exerted on the tow bar C, the bolt 79 pivots on a radius V about the bolt 30, as best shown in FIGURE 12. Concurrently, the steering member 77 pivots on the pin 80 to move the sleeve 76 on a radius of rotation W which is greater than the radius V. The link 75 can only move longitudinally relative to sleeve 76, and as the sleeve is rotated, the link moves therewith. Pivotal movement of the link 75 causes the anchor bolt 74 to rotate on a radius X about the bolt 56. Inasmuch as the radii V, W and X are all of different lengths, there will be relative variations in longitudinal movement of the steering member 77 to the pin 80, as well as link 75 to sleeve 76 when the tow bar C pivots in guiding the articulated vehicle. The radii V, W and X are so selected as to length that the shafts 36 and 66 are concurrently pivoted to the degree that the wheels 72 follow the tracks of the wheels 72'.

When the wheels 42 are pivoted in the manner described during forward movement of the vehicle, the intermediate section B pivots on wheels 118 to follow the section A. In so pivoting, the section B becomes angularly disposed relative to the section A'. This angular relationship of the sections B and A' results in pivoting of tongue 62' to impart movement to the steering member 77' and cause such pivotal movement of wheels 72' and 42' that they will follow in the tracks of the wheels 72 and 42, as illustrated in FIGURES 2 and 3.

Should it be desired to enclose the platforms 14, 98, and 14' to protect the cargo being carried thereon, or to provide refrigerated space therefor, the sides of the sections 14 and 14' and the ends thereof adjacent the tow bars C and C', walls 126 are provided on these platforms that extend upwardly therefrom as shown in FIGURES 8 and 9. Vertically extending slots 128 are formed in the end portions of the walls 126 adjacent sections B. Walls 130 project upwardly from the longitudinal sides of the platform 98, and the end portions 132 of these walls are flexible and extend into the slots 128.

When the section A pivots relative to the section B, as shown in FIGURE 9, the wall portions 132 merely slide in the slots 128, and continue to cooperate with the walls 126, 126' to define an enclosure for the cargo on the vehicle. Roofs 134 and 134' are supported by the walls 126 and 126' (FIGURE 7). A roof 136 is also supported by the walls 130. The roofs 134, 134' and 136 overlap (FIGURE 7) to permit pivotal movement of the sections A and A' relative to the section B.

The use and operation of the invention have been previously described in detail and need not be repeated herein.

A particularly noteworthy feature of the articulated vehicle described above is that its overall length remains constant, irrespective of whether it is being moved in a straight line or in the curved configurations shown in FIGURES 2 and 3. Also, the vehicle operates in the same manner, irrespective of whether it is being drawn by the draw bar C or C'.

Although the vehicle described and illustrated herein is adapted to be drawn by either the draw bar C or C', an engine (not shown) could be mounted on the vehicle to drive the wheels 94, 118 and 94' by conventional power transmission means. The steering mechanism has been illustrated and described as being formed from elongate rigid bars, but should it be desired, suitable swivels and telescoping rigid tubes could be substituted therefor.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. An articulated cargo vehicle that includes:
 (a) first and second end platforms that are in longitudinal spaced relationship;
 (b) first and second decks that project towards one another from adjacent ends of said first and second platforms;
 (c) an intermediate platform disposed between said first and second platforms, which intermediate platform includes end portions that overlie said decks;
 (d) two transverse cross pieces affixed to the under portions of said first and second platforms adjacent the free ends thereof;
 (e) two first pivot members that extend downwardly from said cross pieces;
 (f) two first plates pivotally supported on said pivot members;
 (g) a first tow bar that extends from said first plate under said first platform;
 (h) two second pivot members that extend downwardly from said first and second decks;
 (i) two second plates that are pivotally supported on said second pivot members;
 (j) two vertical anchor bolts that depend from opposite end portions of said second plates;
 (k) three elongate rigid tow bar sections disposed end-to-end and in pivotal engagement with said first and second pivot members, which tow bar sections serve to transmit a tractive force on said tow bar longitudinally under said first and second sections and said intermediate section without imposing a strain thereon;
 (l) two first wheel assemblies disposed under said first plates and rigidly connected thereto;
 (m) two second wheel assemblies disposed under said second plates and rigidly connected thereto;
 (n) two third wheel assemblies disposed under said first and second platforms and rigidly affixed thereto, each of which third assemblies are disposed between one of said first and second assemblies;
 (o) two vertical first bolts held in fixed positions relative said first plates and which pivot with said first plates about said first pivot members; and
 (p) first and second steering means extending under said first and second platforms in opposite directions that are pivotally connected to said anchor bolts and first bolts, with said first steering means pivoting said second plate and said second wheel assembly under said first deck to the extent that said second wheel assembly under said first deck follows said first wheel assembly under said first platform as said vehicle is moved forwardly and said tow bar is pivoted relative thereto, with said second steering means when said intermediate platform moves angularly relative to said second platform pivoting said first plate and first wheel assembly under said second platform to the extent that said two first wheel assemblies have substantially the same track.

2. An articulated cargo vehicle as defined in claim 1 which further includes:
 (q) a second tow bar that projects from said first plate under said second end platform to permit said vehicle to be drawn in either of two opposite directions.

3. An articulated cargo vehicle as defined in claim 1 which further includes:
 (q) a fourth wheel assembly disposed under said intermediate platform and rigidly affixed thereto which provides for more uniform distribution of a load on the surface on which said vehicle rests, and on which said intermediate platform pivots when said first platform is moved forwardly and angularly relative to said intermediate platform.

4. An articulated cargo vehicle as defined in claim 1 wherein said first steering means includes:
 (q) an elongate link is disposed under said first platform and pivotally connected to one of said anchor bolts;
 (r) an elongate rigid steering member is situated under said first platform, with that end portion of said member adjacent said first tow bar pivotally engaging one of said first bolts;
 (s) first means on that end of said steering member most remote from said tow bar for slidably engaging said link; and
 (t) second means disposed under said first platform for pivotally and slidably engaging a portion of said steering member intermediate the ends thereof to cause said steering member to pivot said second wheel assembly under said first deck as said first wheel assembly and first plate under said first platform is pivoted by a lateral force applied to said tow bar.

5. An articulated cargo vehicle as defined in claim 4 wherein said first means comprises a sleeve on said steering member.

6. An articulated cargo vehicle as defined in claim 4 wherein said second means comprises:
 (u) a vertically disposed pin held in a fixed position under said first platform, which pin pivotally and slidably engages an elongate slot in said steering member.

7. An articulated cargo vehicle as defined in claim 1 which further includes:
 (q) first and second walls that extend upwardly from the longitudinal sides and free ends of said first and second platforms, respectively;
 (r) third walls that extend upwardly from the longitudinal sides of said intermediate platform and outwardly therebeyond to slidably engage said first and second walls, with those portions of said third walls in slidable engagement with said first and second walls being flexible; and
 (s) first means for holding said projecting portions of said third walls in slidable engagement with said first and second walls.

8. An articulated cargo vehicle as defined in claim 7 wherein said first means comprise vertical slots formed in said first and second walls adjacent said intermediate platform in which said projecting portions of third walls are slidably movable.

9. An articulated cargo vehicle as defined in claim 7 which further includes a plurality of overlapping roof sections that are supported by the upper portions of said first, second and third walls, which roof sections and said first, second and third walls, together with said first and second end platforms and said intermediate platform cooperatively define an enclosed space in which cargo can be carried.

References Cited by the Examiner

UNITED STATES PATENTS

| 1,416,613 | 5/1922 | Collardeau | 280—442 X |
| 3,185,108 | 5/1965 | Muller | 105—3 |

FOREIGN PATENTS

| 660,099 | 3/1963 | Canada. |
| 348,604 | 2/1905 | France. |
| 24,232 | 1905 | Great Britain. |

LEO FRIAGLIA, *Primary Examiner.*